(12) United States Patent
Weiß et al.

(10) Patent No.: US 10,717,395 B2
(45) Date of Patent: Jul. 21, 2020

(54) ENERGY ABSORPTION ELEMENT FOR AN UNDERFRAME OF A MOTOR VEHICLE AS A RESONANCE VOLUME AND MOTOR VEHICLE

(71) Applicant: AUDI AG, Ingolstadt (DE)

(72) Inventors: Simon Weiß, Ingolstadt (DE); Manuel Wenzel, Geisenfeld (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 16/472,753

(22) PCT Filed: Apr. 9, 2018

(86) PCT No.: PCT/EP2018/058977
§ 371 (c)(1),
(2) Date: Jun. 21, 2019

(87) PCT Pub. No.: WO2018/197190
PCT Pub. Date: Nov. 1, 2018

(65) Prior Publication Data
US 2019/0381949 A1  Dec. 19, 2019

(30) Foreign Application Priority Data
Apr. 28, 2017  (DE) .......... 10 2017 207 199

(51) Int. Cl.
*B60R 11/02* (2006.01)
*B62D 21/16* (2006.01)
(Continued)

(52) U.S. Cl.
CPC ........ *B60R 11/0217* (2013.01); *B62D 21/155* (2013.01); *B62D 21/16* (2013.01); *H04R 1/2811* (2013.01); *B60G 11/30* (2013.01)

(58) Field of Classification Search
None
See application file for complete search history.

(56) References Cited

U.S. PATENT DOCUMENTS 5,170,435 A * 12/1992 Rosen ................. B60R 11/0217
181/144
6,868,937 B2 * 3/2005 Cass ........................ H04R 5/02
181/192
(Continued)

FOREIGN PATENT DOCUMENTS

CN       101448679 A    6/2009
CN       201432693 Y    3/2010
(Continued)

OTHER PUBLICATIONS

International Preliminary Report on Patentability directed to related International Patent Application No. PCT/EP2018/058977, dated Mar. 28, 2019, with attached English-language translation; 10 pages.
(Continued)

*Primary Examiner* — James K Mooney
(74) *Attorney, Agent, or Firm* — Sterne, Kessler, Goldstein & Fox P.L.L.C.

(57) ABSTRACT

The approach relates to an energy absorption element for a support frame of a motor vehicle and is characterized in that a cross-sectional profile is designed as a hollow profile which remains constant along a longitudinal direction of the energy absorption element having at least two closed chambers, so that the energy absorption element comprises at least two mutually separate chamber cavities and the at least two chamber cavities have an elongated shape along the longitudinal direction of the energy absorption element and each chamber cavity is open at two longitudinal ends of the energy absorption element and each chamber cavity is fluidly connected to a sound generator.

18 Claims, 7 Drawing Sheets

(51) Int. Cl.
  *B62D 21/15* (2006.01)
  *H04R 1/28* (2006.01)
  *B60G 11/30* (2006.01)

(56) References Cited

U.S. PATENT DOCUMENTS

| | | | |
|---|---|---|---|
| 8,044,413 | B2 | 10/2011 | Albus et al. |
| 8,130,976 | B2 | 3/2012 | Linhard et al. |
| 9,994,149 | B2 | 6/2018 | Hillers |
| 2008/0247564 | A1* | 10/2008 | Albus ............ B60R 11/0217 381/86 |
| 2009/0185709 | A1* | 7/2009 | Linhard ............ B60R 13/0237 381/389 |

FOREIGN PATENT DOCUMENTS

| | | |
|---|---|---|
| CN | 106340289 A | 1/2017 |
| DE | 19735082 A1 | 2/1999 |
| DE | 19909143 A1 | 11/2000 |
| DE | 102005046594 B3 | 3/2007 |
| DE | 102006023909 B3 | 7/2007 |
| DE | 102008015490 A1 | 10/2009 |
| DE | 102010014574 A1 | 10/2011 |
| DE | 102013001866 A1 | 8/2014 |
| DE | 102014017861 A1 | 3/2016 |

OTHER PUBLICATIONS

International Search Report and Written Opinion of the International Searching Authority directed to related International Patent Application No. PCT/EP2018/058977, dated Jul. 9, 2018, with attached English-language translation; 14 pages.

\* cited by examiner

ENERGY ABSORPTION ELEMENT FOR AN UNDERFRAME OF A MOTOR VEHICLE AS A RESONANCE VOLUME AND MOTOR VEHICLE

TECHNICAL FIELD

The present application relates to an energy absorption element for a support frame of a motor vehicle as a resonance volume and a motor vehicle equipped therewith.

BACKGROUND

For controllable sound generation, a sound generator, e.g. a loudspeaker, can emit a generated sound into a resonance volume of a cavity. In the bass frequency range of 0-150 Hz, a resonance volume is required for this, which due to its size in a motor vehicle can often not be provided separately. For this reason, it is common in motor vehicles to resort to existing cavities as resonance volumes. The cavities used for this purpose also include cavities within a supporting structure of a motor vehicle. In this case, however, the problem arises that safe impact characteristics and an acoustically optimal design of the components can contradict each other.

DE 10 2008 015 490 A1 describes a motor vehicle with a resonance volume for a loudspeaker. It is provided that the resonance volume is at least partially limited by a bottom plate of the motor vehicle and includes a cavity in a rocker panel. An acoustically open energy absorption element is arranged in the rocker panel which is adapted to maintain a side impact characteristic.

In DE 197 35 082 A1 an arrangement of a woofer under a vehicle seat is described. In this case, the resonance volume of the loudspeaker is at least partially formed by the rocker panel volume enclosed by a support frame.

DE 10 2006 023 909 B3 describes a bandpass box in the support structure of a vehicle. It is provided that separate subspaces connect to each membrane side of a speaker which are formed by the volume of the cavity of at least one element of the support structure of the vehicle.

BRIEF DESCRIPTION OF THE DRAWINGS/FIGURES

DETAILED DESCRIPTION

Figure 1:
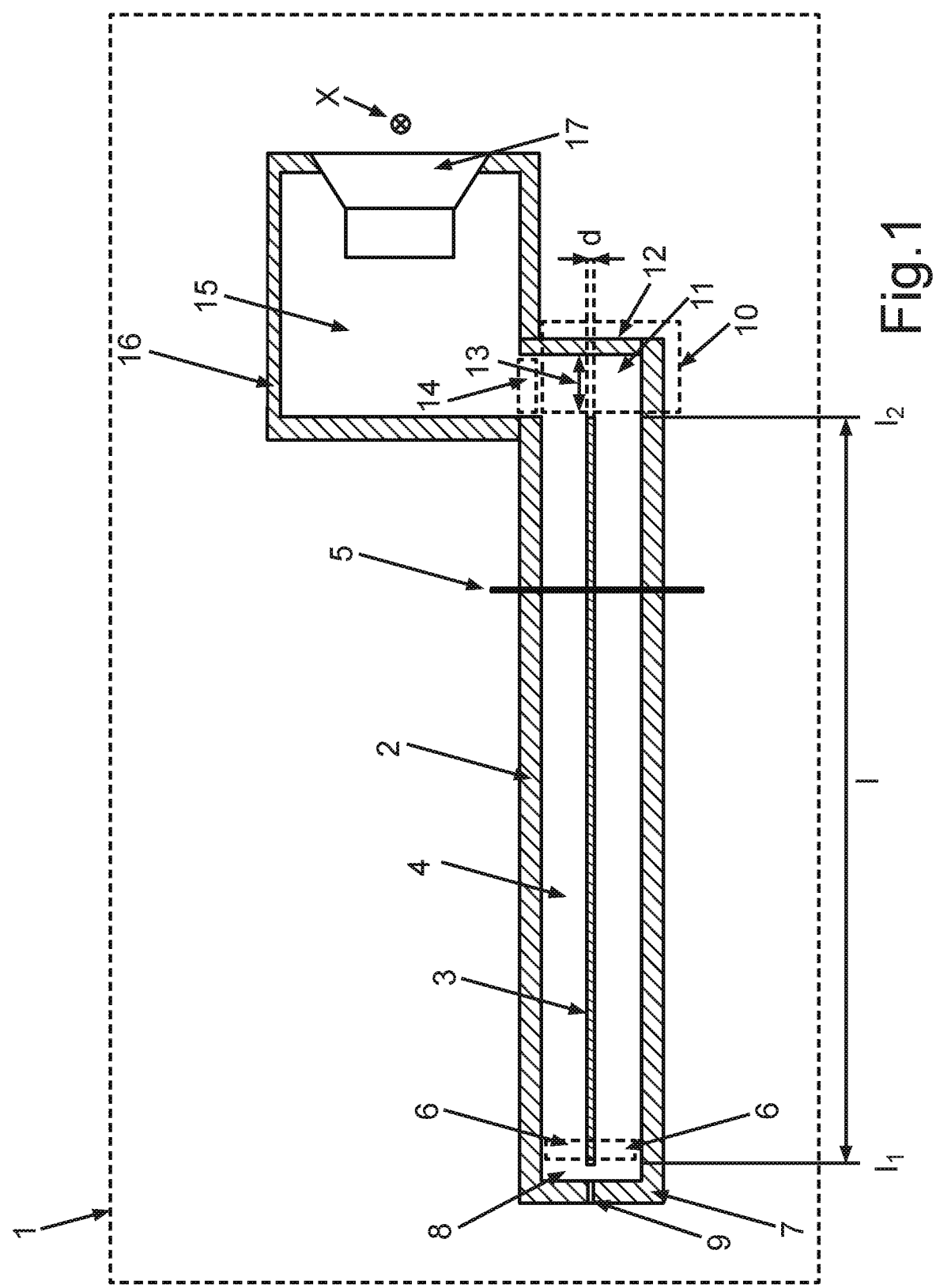
FIG. 1 shows a longitudinal section profile of an energy absorption element, in accordance with some embodiments.

The object of the present application is to enable a use of cavities of a supporting structure of a motor vehicle and thereby to maintain their safe deformation characteristic.

The object is achieved by the subjects of the independent claims. Advantageous developments of the present application are disclosed by the features of the dependent claims, the following description, and the drawings.

In accordance with some embodiments, an energy absorption element for a support frame of a motor vehicle is disclosed. This is characterized in that, at least in sections, its cross-sectional profile is designed as a hollow profile which remains constant along a longitudinal direction of the energy absorption element having at least two closed chambers, so that the energy absorption element comprises at least two mutually separate chamber cavities. Such an energy absorption element is also called crash profile or deformation structure. The at least two chamber cavities have an elongated shape along the longitudinal direction of the energy absorption element. Each chamber cavity is open at two longitudinal ends of the energy absorption element and fluidly connected to a sound generator. In other words, the energy absorption element is a single component having a dual-chamber hollow profile which remains constant, thereby forming two separate chamber cavities open at two longitudinal ends of the energy-absorption element. The chamber cavities thus represent at least two mutually parallel tubes which are open at their ends. Due to the one-piece hollow profile, it has the advantage that it is a single component which comprises a plurality of cavities. Thus, the energy absorption element can be used as a resonance chamber for the sound generator, wherein a plurality of resonance volumes are available.

In accordance with some embodiments, it is provided that in the cross-sectional profile at least some chambers are rectangular, wherein their edge lengths are each 3 to 15 mm. In other words, at least some of the chambers may have a rectangular shape, which has a height and a width of 3 to 15 mm, respectively. The chamber cavity associated with such a chamber can thus have a shape of a cuboid which is dimensioned by the said rectangular clear cross-section of a chamber in the cross-sectional profile and a length of the energy-absorption element. This results in the advantage that an energy absorption element designed in this way can comprise a structuring or bending stiffness, whereby a predeterminable mechanical impact behavior and at the same time a sufficiently large volume can be provided for a resonance space. In particular, an area of a 5×5 mm square chamber allows for advantageous mechanical impact behavior with negligible resonance frequency limitations.

In accordance with some embodiments, at least some chambers have a geometric equivalent circular area diameter of 4 to 30 mm. In other words, at least some chambers may have a round or rounded or polygonal shape, the area of which corresponds to a circle with a diameter of 4 to 30 mm. This has the advantage that chamber cavities can have shapes which have a predetermined deformation characteristic in the event of an impact and at the same time are sound-conducting.

In accordance with yet another embodiment, the chamber cavities are separated by walls of a width of 1 to 2 mm. In other words, the walls which are located between and define the chamber cavities have a thickness of 1 to 2 mm. This has the advantage that, in combination with suitable chamber dimensions, an energy absorption element with a low weight can be provided.

In accordance with another embodiment, a connecting chamber is arranged at one of the longitudinal ends of the energy absorption element which forms a connecting cavity into which the chamber cavities lead and which fluidly connects the chamber cavities with each other. In other words, located at one of the longitudinal ends there is a connecting chamber through which air and/or airborne sound can change between the chamber cavities, so that the chamber cavities and the connecting cavity thus form a continuous cavity. This results in the advantage that one larger resonance volume is provided instead of a plurality of small resonance volumes.

In accordance with yet another embodiment, an inlet chamber is formed at one of the longitudinal ends of the energy absorption element, which forms an inlet cavity into which the chamber cavities of the energy absorption element and a cavity of a tone generator lead, wherein a distance between the one face opposite the mouths of the chamber cavities and a longitudinal end of the energy absorption element (that is, one respective end of the chamber cavities) has a value which is in a range of 10 mm to 50 mm, in particular 20 mm. In other words, at one longitudinal end there is an inlet chamber which fluidly connects the chamber cavities to one another and to the tone generator with a cavity of a sound generator, a surface which is arranged opposite to the longitudinal end being at a distance in the range from 10 mm to 50 mm, in particular 20 mm, to this. Of course, the inlet chamber and the connecting chamber are arranged at different or opposite ends of the chamber cavities. The inlet chamber may for example be a cavity of a support frame in which or on which the energy absorption element is arranged. The development is based on the finding that a relatively shallow inlet chamber is sufficient to feed the airborne sound of a sound generator into all chamber cavities. This provides the advantage that the energy absorption element need not be shortened to provide additional space for the inlet cavity. Impairments of the deformation behavior can thus be prevented.

In accordance with some embodiments, a total cavity, consisting of the chamber cavities, the inlet cavity, the connecting cavity and the cavity of the tone generator, is dimensioned such that it has at least one dominant resonance frequency between 0 and 200 Hz. In other words, the overall cavity consisting of the chamber cavities, the inlet cavity, the connecting cavity and the cavity of the tone generator has dimensions which result in at least one dominant resonance frequency between 0 and 200 Hz. This results in the advantage that the entire cavity is adapted to generate resonance frequencies in the lower frequency spectrum of sound generators. Suitable dimensions can be determined in experiments. The dimensions which are necessary for maintaining a given deformation characteristic can thereby be kept unchanged and the remaining dimensions can then be varied to adjust the resonance behavior until at least one dominant resonance frequency lies in the said frequency interval. An additional or alternative adjustment offers the following further development.

In accordance with some embodiments, a wall opposite a longitudinal end has an opening which has a diameter of 1 to 10 mm. In particular, the connecting cavity has an opening with a diameter of 1 to 10 mm in a wall which is opposite to the longitudinal end, i.e. the mouths of the chamber cavities. This opening can cause a shift of a resonance frequency. This results in the advantage that it is possible to shift a resonance frequency by means of the choice of a suitable diameter of the opening to a desired frequency. The resonance behavior can hereby be adjusted such that at least one dominant resonance frequency lies in the said frequency interval. A drop in the sound pressure level occurring in case of a resonance can thus be advantageously shifted to a higher frequency.

In accordance with some embodiments, the energy absorption element is a continuous casting component the cross-sectional profile of which is produced by means of an extrusion process. In other words, a component is used to make the energy absorption element, which is manufactured by continuous casting. The profile was produced using extrusion techniques. A continuous casting component has a rigidity which prevents or reduces the incorporation of structure-borne noise from the chamber cavities into the walls of the energy absorption element. This reduces the losses. On the contrary, for example, riveted or screwed individual parts allow vibrational movements of the individual parts against each other, which ultimately leads to heat loss.

In accordance with some embodiments, a motor vehicle with an energy absorption element as described herein is disclosed.

The exemplary embodiments explained below are preferred embodiments and describe components of the embodiments each constitute individual features that are to be considered in isolation from one another or in a different combination from that disclosed. In addition, features other than those already described can be added to the embodiments described.

In the drawings, elements with the same function have been provided with the same reference signs.

FIG. 1 shows a longitudinal sectional profile of an energy absorption element, in accordance with some embodiments. FIG. 1 shown an energy absorption element 1 with the elements contained and connected thereto. The energy absorption element 1 comprises an outer frame 2 formed by outer walls. Partitions 3 of a thickness d may be arranged in the interior of the energy absorption element which delimit chamber cavities 4 from one another. The cross section 5 of the energy absorption element 1 remains constant over a length l of the energy absorption element 1. At two longitudinal ends $l_1$, $l_2$ of the energy absorption element 1, the chamber cavities 4 have mouths or chamber openings 6. The energy absorption element 1 may be a component which has been produced in a continuous casting process and subsequently processed by means of an extrusion process. Thus, it may consist of a single component, whereby vibration noise due to vibrating sections can be avoided. A connecting chamber 7 may be arranged at one longitudinal end 1l of the energy absorption element 1 which frames or delimits a connecting cavity 8. The connecting chamber 7 may be closed except for an opening 9 to the outside. The chamber cavities 4 can lead into the connecting cavity 8, whereby they can be fluidly connected to each other. An inlet chamber 10 may be arranged at another longitudinal end $l_2$ of the energy absorption element 1 which encloses or delimits an inlet cavity 11. The inlet cavity 11 may be a cavity of a support structure. The inlet chamber 10 may have a wall 12, which is arranged opposite a longitudinal end $l_2$ of the energy absorption element 1. This can be arranged such that it has a distance 13 of, for example, 20 mm to the longitudinal end. An inlet passage 14 to a cavity 15 formed by a sound generation chamber 16 of a sound generation element 17 may thereby also have a length of 20 mm. The cavity 15 of the sound generating chamber 16 may be adjacent to the sound generating element 17. The sound generating element 17 may be, for example, a speaker with a diaphragm. The cavity of the sound generating element 15, the inlet cavity 11, the chamber cavities 4 and the connecting cavity 8 may be dimensioned such that the total cavity formed by these cavities has at least one dominant resonance frequency $f_R$ between 0 and 200 Hz. It may be that the opening 9 is dimensioned such that at least one resonance frequency $f_R$ is shifted to a desired frequency $f_1$. For the description of a possible curve of the sound pressure level Spl against an excitation frequency f, a detection location X of the level profiles shown in the following figures is indicated.

Figure 2:
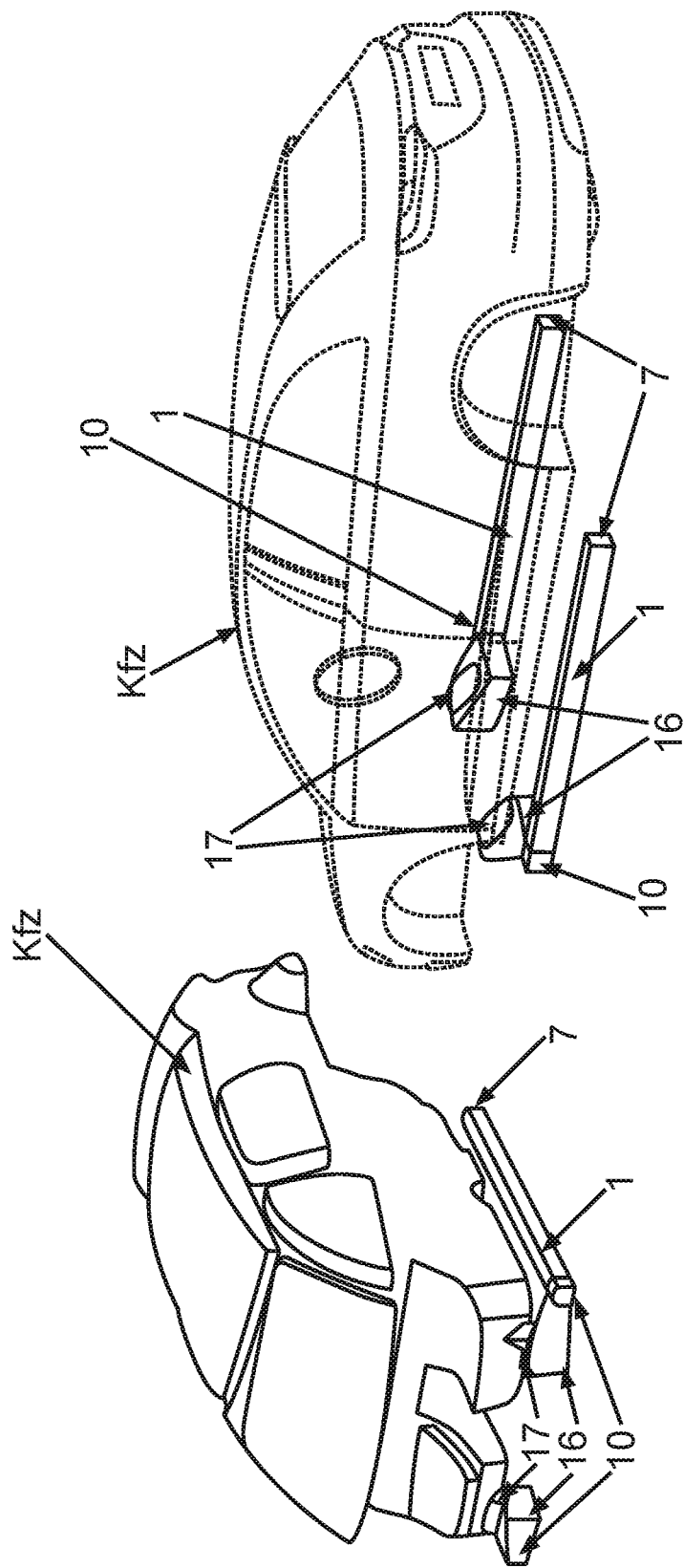
FIG. 2 shows two energy absorption elements arranged in a motor vehicle, in accordance with some embodiments.

FIG. 2 shows two energy absorption elements arranged in a motor vehicle, in accordance with some embodiments. FIG. 2 shows two energy absorption elements 1 arranged in a motor vehicle Kfz with connected elements from two different viewing angles. In this case, the energy absorption elements 1 can be arranged in a cavity of a side rocker panel of the motor vehicle Kfz. At each energy absorption element 1, an inlet chamber 10 can be arranged at a longitudinal end $l_2$, via which a fluid connection to a sound generation chamber 16 of a sound generation element 17 can be produced. A connecting chamber 7 may be arranged at one longitudinal end $l_1$.

Figure 3:
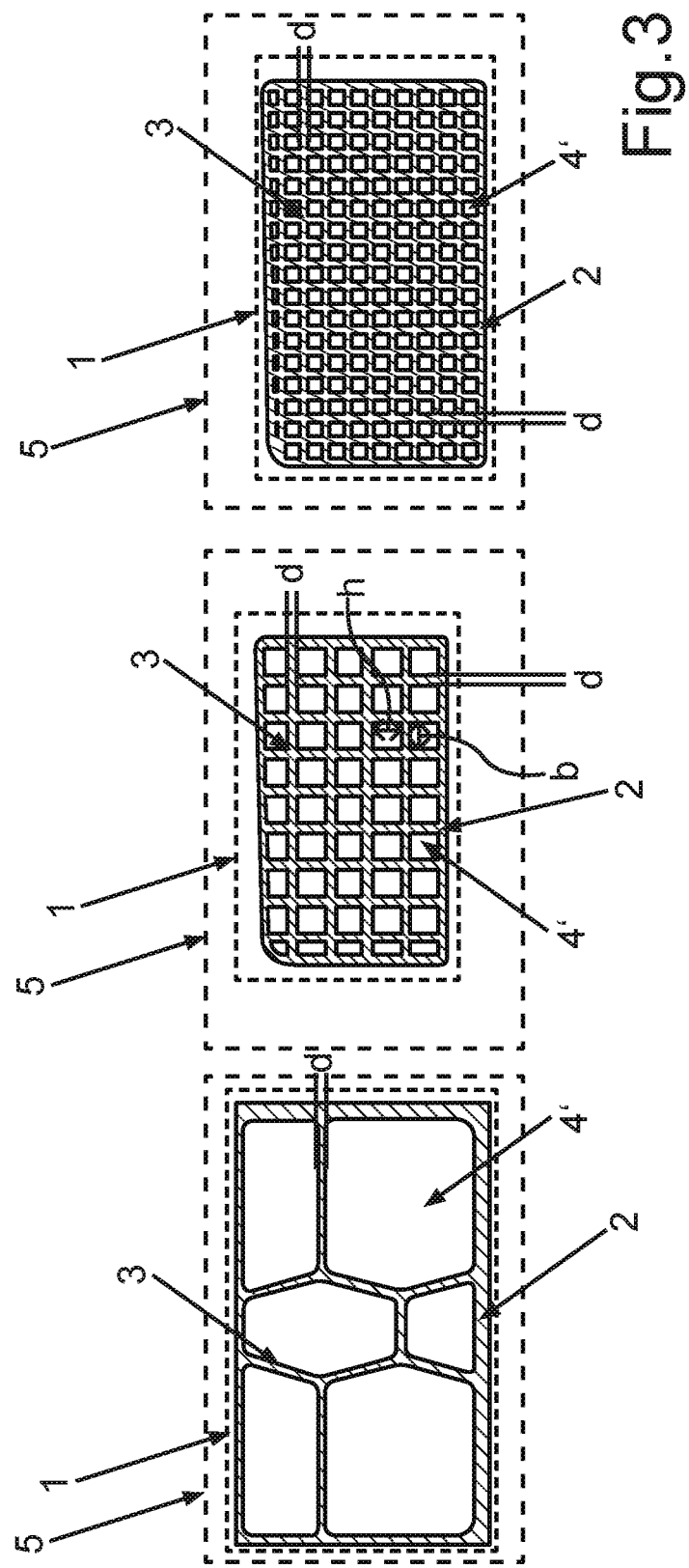
FIG. 3 shows a cross-sectional profile, in accordance with some embodiments.

FIG. 3 shows a cross-sectional profile, in accordance with some embodiments. FIG. 3 shows three possible cross sections 5 of an energy absorption element 1 which lie in a plane which is aligned normally to the longitudinal direction 1 of the energy absorption element 1. The cross section of the energy absorption element 5 may be limited by an outer frame 2. Within the energy absorption element 1, partitions 3 of a thickness d may form a profile comprising a plurality of separate chambers 4' which belong to the respective chamber cavities 4. The thickness of the partitions can be 1 to 2 mm. At least some chamber cavities 4 may have chambers 4' in cross-section, which have a polygonal, a rectangular or a round shape. At least some chambers 4' may have a rectangular shape, wherein a width b and a height h may each be between 3-15 mm. At least some chambers 4' may have an area corresponding to a circular area having an equivalent circular area diameter of 4-30 mm. The design of the chamber cavities may be such that at least some chambers have a size of 10×10 mm and thus a cavity with a volume of 4.7 l can be formed. The chambers may also be designed to have dimensions of 5×5 mm and thus provide an available volume of 4.6 l.

Figure 4:
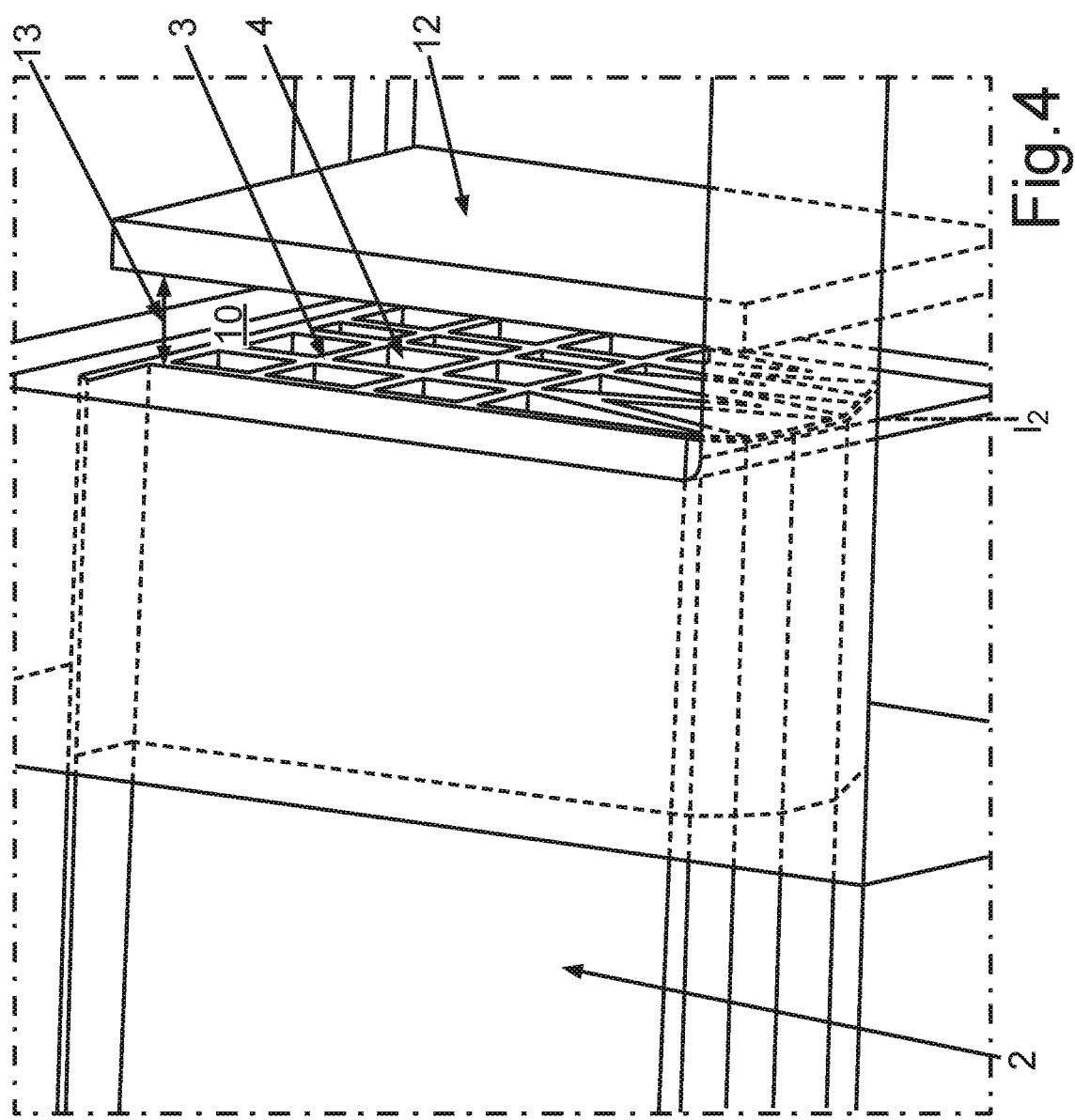
FIG. 4 shows an an inlet chamber, in accordance with some embodiments.

FIG. 4 shows an inlet chamber, in accordance with some embodiments. FIG. 4 shows one possible embodiment of an inlet chamber 10. The inlet chamber 10 may comprise a wall 12, which may be arranged at a distance 13 of, for example, 20 mm to a longitudinal end $l_2$ of the energy absorption element 1. FIG. 4 also shows the outer frame 2 of the energy absorption element 1 and partitions 3, which separate chamber cavities 4 from each other.

Figure 5:
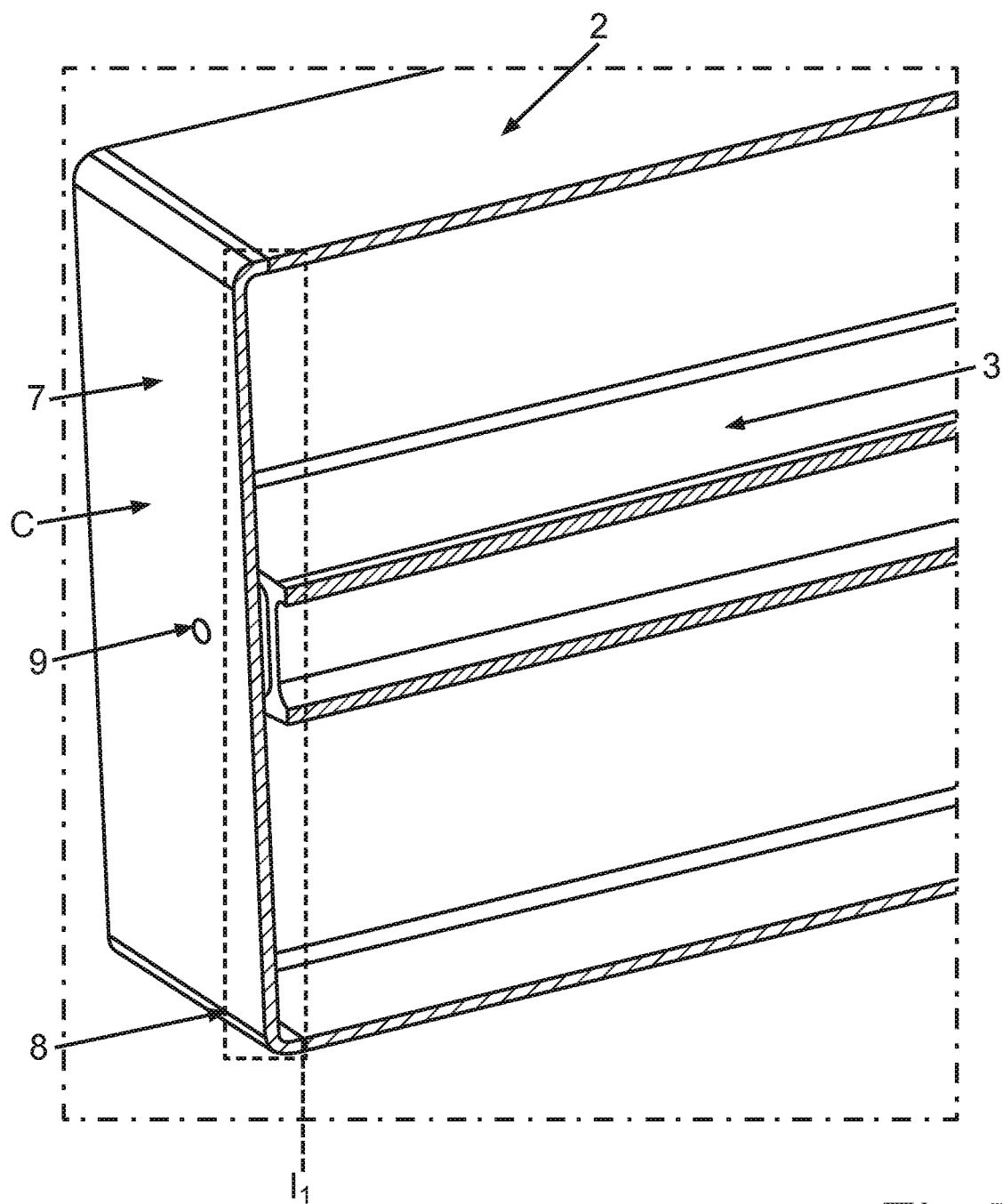
FIG. 5 shows an embodiment of a connecting chamber, in accordance with some embodiments.

FIG. 5 shows an embodiment of a connecting chamber, in accordance with some embodiments. FIG. 5 shows one possible embodiment of a connecting chamber 7, which encloses a connecting cavity 8. In the connecting chamber 7, an opening 9 can be incorporated in a wall. The connecting chamber 7 may be located at one longitudinal end $l_1$ of the energy absorption element 1 and be connected directly to the outer frame 2 of the energy absorption element 1. The opening may have a surface which may lead to a shift in the resonant frequency $f_R$ of the entire hollow body.

Figure 6:
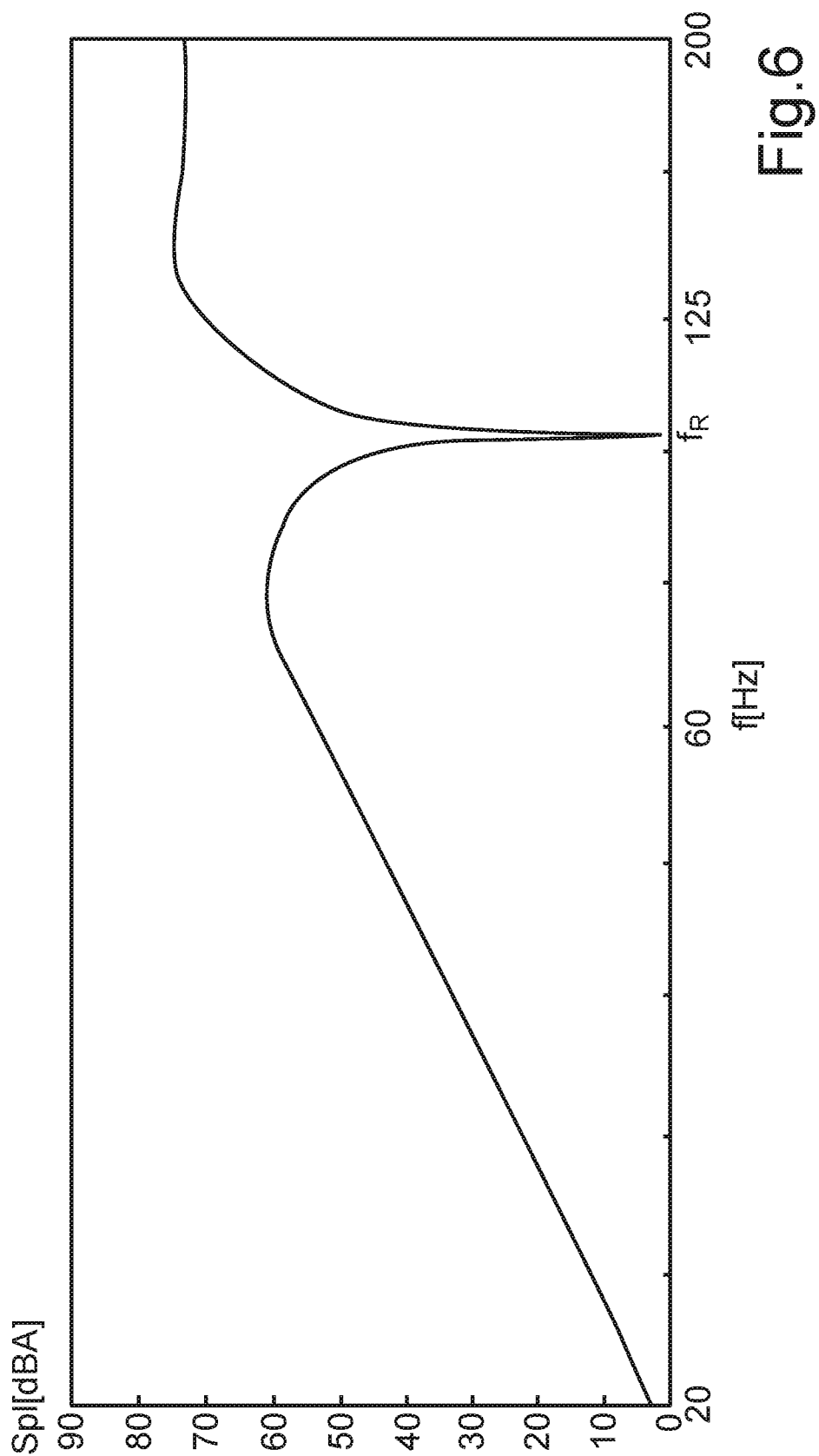
FIG. 6 shows a frequency curve, in accordance with some embodiments.

FIG. 6 shows a frequency curve, in accordance with some embodiments. FIG. 6 shows one possible frequency response of a system consisting of a connecting chamber 7, an inlet chamber 10, an energy absorption element 1 and a sound generation chamber 16 which is excited by a sound generation element 17. In the diagram, the sound pressure level Spl is plotted against the excitation frequency f of the system. In the range of a resonance frequency $f_R$ of the system, the sound pressure level falls to a minimum. A curve can occur at the detection location X.

Figure 7:
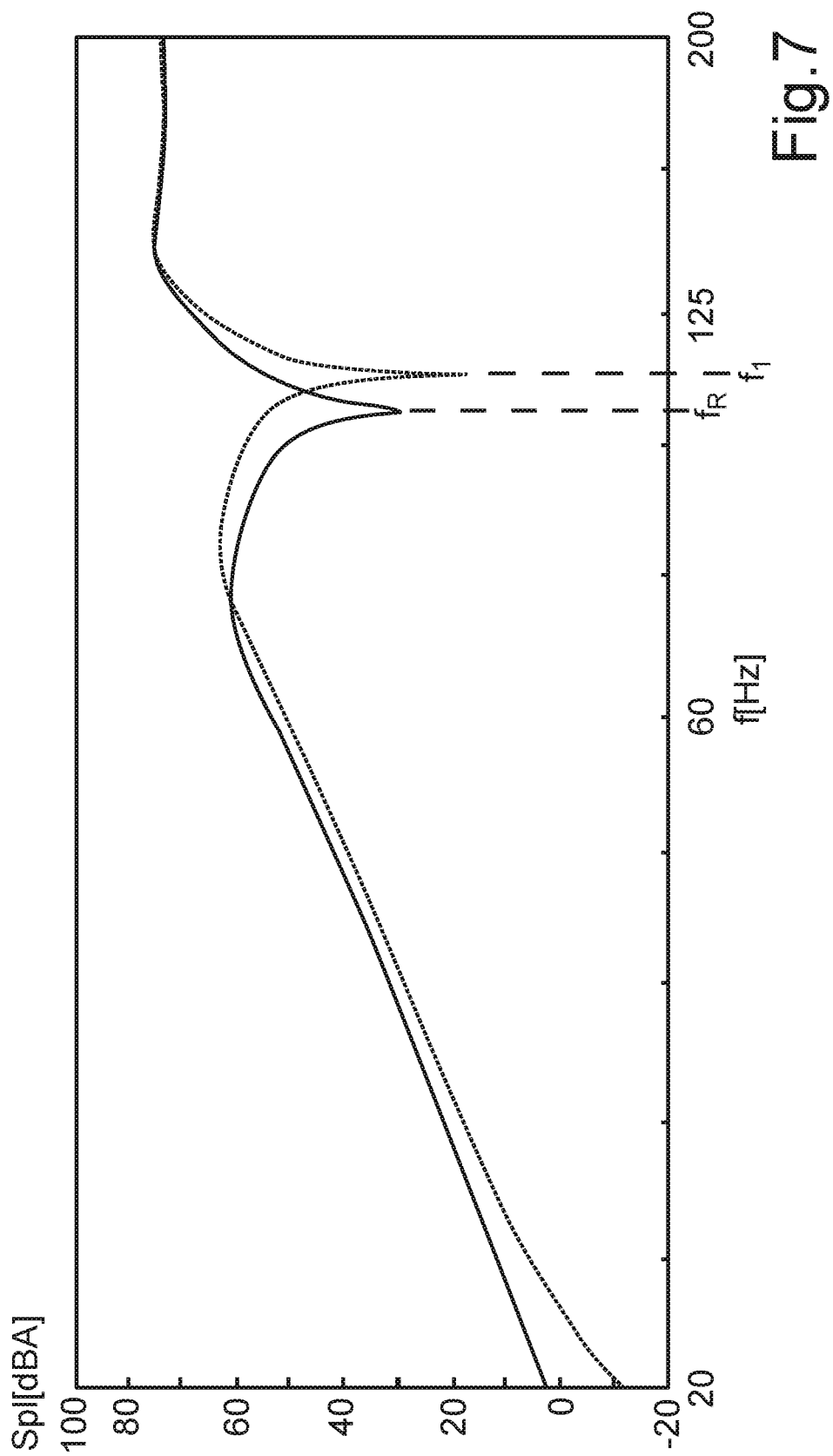
FIG. 7 shows a change of a frequency curve, in accordance with some embodiments.

FIG. 7 shows a change of a frequency curve, in accordance with some embodiments. FIG. 7 shows a comparison of possible frequency responses of a system consisting of a connecting chamber 7, an inlet chamber 10, an energy absorption element 1 and a sound generation chamber 16 which is excited by a sound generation element 17. In this case, the connecting chamber 7 of one of the systems comprises an opening 9. In the diagram, the sound pressure level Spl is plotted against the excitation frequency f of the system. The opening 9 causes a change of a resonance frequency $f_R$ of the system, whereby the resonance frequency $f_R$ shifts to a desired resonance frequency $f_1$. A curve can occur at the detection location X.

Overall, the examples show how to use crash profiles with a large number of cavities as resonance bodies for loudspeakers.

The invention claimed is:

1. An energy absorption element for a supporting frame of a motor vehicle comprising:
   a plurality of chambers having a cross-sectional profile; and
   a sound generator,
   wherein the cross-sectional profile is a hollow profile that is constant along a longitudinal direction of the energy absorption element,
   wherein at least two chambers of the plurality of chambers are closed chambers along the longitudinal direction of the energy absorption element, and wherein the at least two chambers are mutually separate chambers,
   wherein the at least two chambers are each of an elongated shape and fluidly connected to the sound generator, and
   wherein the at least two chambers each comprises chamber openings at two longitudinal ends of the energy absorption element.

2. The energy absorption element of claim 1, wherein the plurality of chambers are of rectangular shape having edge lengths of 3 to 15 mm.

3. The energy absorption element of claim 1, wherein the plurality of chambers are circular having a diameter of 4 to 30 mm.

4. The energy absorption element of claim 1, wherein the plurality of chambers are separated by partitions of 1 to 2 mm of width.

5. The energy absorption element of claim 1, further comprising:
   a connecting chamber arranged at one of the two longitudinal ends of the energy absorption element, wherein the connecting chamber forms a connecting cavity by fluidly connecting the plurality of chambers leading into the connecting chamber.

6. The energy absorption element of claim 1, further comprising:
   a cavity of a sound generating chamber; and
   an inlet chamber formed on one of the two longitudinal ends of the energy absorption element,
   wherein the inlet chamber forms an inlet cavity into which the plurality of chambers and the cavity of the sound generating chamber lead,
   wherein a distance between the two longitudinal ends of the energy absorption elements is 20 to 40 mm.

7. The energy absorption element of claim 1, further comprising:
   an overall cavity comprising:
   a cavity of a tone generator;
   an inlet cavity;
   a connecting cavity; and
   the plurality of chambers, wherein the overall cavity is dimensioned to have at least one dominant resonance frequency ($f_R$) between 0 and 200 Hertz (Hz).

8. The energy absorption element of claim 1, further comprising:
a wall opposite to one of the two longitudinal ends of the energy absorption element, wherein the wall has an opening with a diameter of 1 to 10 mm.

9. The energy absorption element of claim 1, wherein the energy absorption element is a continuous casting, and wherein the cross-sectional profile is produced through an extrusion process.

10. A motor vehicle, comprising:
an energy absorption element, comprising:
a plurality of chambers having a cross-sectional profile; and
a sound generator,
wherein the cross-sectional profile is a hollow profile that is constant along a longitudinal direction of the energy absorption element,
wherein at least two chambers of the plurality of chambers are closed chambers along the longitudinal direction of the energy absorption element, and wherein the at least two chambers are mutually separate chambers,
wherein the at least two chambers are each of an elongated shape and fluidly connected to the sound generator, and
wherein the at least two chambers each comprises chamber openings at two longitudinal ends of the energy absorption element.

11. The motor vehicle of claim 10, wherein the plurality of chambers are of rectangular shape having edge lengths of 3 to 15 mm.

12. The motor vehicle of claim 10, wherein the plurality of chambers are circular having a diameter of 4 to 30 mm.

13. The motor vehicle of claim 10, wherein the plurality of chambers are separated by partitions of 1 to 2 mm of width.

14. The motor vehicle of claim 10, wherein the energy absorption element further comprises:
a connecting chamber arranged at one of the two longitudinal ends of the energy absorption element, wherein the connecting chamber forms a connecting cavity by fluidly connecting the plurality of chambers leading into the connecting chamber.

15. The motor vehicle of claim 10, wherein the energy absorption element further comprises:
a cavity of a sound generating chamber; and
an inlet chamber formed on one of the two longitudinal ends of the energy absorption element,
wherein the inlet chamber forms an inlet cavity into which the plurality of chambers and the cavity of the sound generating chamber lead,
wherein a distance between the two longitudinal ends of the energy absorption elements is 20 to 40 mm.

16. The motor vehicle of claim 10, wherein the energy absorption element further comprises:
an overall cavity comprising:
a cavity of a tone generator;
an inlet cavity;
a connecting cavity; and
the plurality of chambers,
wherein the overall cavity is dimensioned to have at least one dominant resonance frequency ($f_R$) between 0 and 200 Hertz (Hz).

17. The motor vehicle of claim 10, wherein the energy absorption element further comprises a wall opposite to one of the two longitudinal ends of the energy absorption element, wherein the wall has an opening with a diameter of 1 to 10 mm.

18. The motor vehicle of claim 10, wherein the energy absorption element is a continuous casting, and wherein the cross-sectional profile is produced through an extrusion process.

* * * * *